United States Patent [19]

Caprio

[11] 4,427,982

[45] Jan. 24, 1984

[54] RADAR CLUTTER REDUCTION BY USE OF FREQUENCY-DIVERSE, WIDEBAND PULSE-COMPRESSION WAVEFORMS

[75] Inventor: Samuel J. Caprio, Severna Park, Md.

[73] Assignee: The United States of America as represented by the Secretary of the Navy, Washington, D.C.

[21] Appl. No.: 258,346

[22] Filed: Apr. 28, 1981

[51] Int. Cl.³ .............................................. G01S 7/28
[52] U.S. Cl. ..................... 343/17.2 PC; 343/17.5
[58] Field of Search .......... 343/17.2 PC, 7.7, 100 CL, 343/17.2 R, 14, 5 SW, 5 AF, 5 CE, 17.1 R, 17.1 PF, 17.1 PW, 17.5; 367/102

[56] References Cited

U.S. PATENT DOCUMENTS

| | | | |
|---|---|---|---|
| 3,290,679 | 12/1966 | Brault et al. | 343/17.2 PC |
| 3,363,248 | 1/1968 | Nicodemus | 343/17.2 PC |
| 3,374,478 | 3/1968 | Blau | 343/5 R |
| 3,403,394 | 9/1968 | Rouault | 343/5 R |
| 3,460,141 | 8/1969 | Bouman | 343/17.2 R |
| 3,878,525 | 4/1975 | Alpers | 343/14 |
| 3,905,033 | 9/1975 | Moore | 343/7.7 |
| 3,945,012 | 3/1976 | Cooper | 343/17.2 R |
| 4,121,212 | 10/1978 | Taylor | 343/7.7 X |
| 4,153,900 | 5/1979 | Novak et al. | 343/17.2 PC |

*Primary Examiner*—Maynard R. Wilbur
*Assistant Examiner*—Robert C. Burk

[57] ABSTRACT

A method of and an apparatus for generating and transmitting wideband, expanded radar pulses which spatially decorrelate clutter and are frequency-hopped from pulse to pulse by the proper frequency difference for clutter decorrelation by frequency-diversity are disclosed. The returned signals are compressed, delayed by one pulse interval and correlated, each with its succeeding echo pulse, to decorrelate the clutter returns but not the target echoes. The frequencies of the transmitted pulses are locked to the local oscillator frequency which is very stable. A double-sideband technique is used to generate the different pulse frequencies.

7 Claims, 10 Drawing Figures

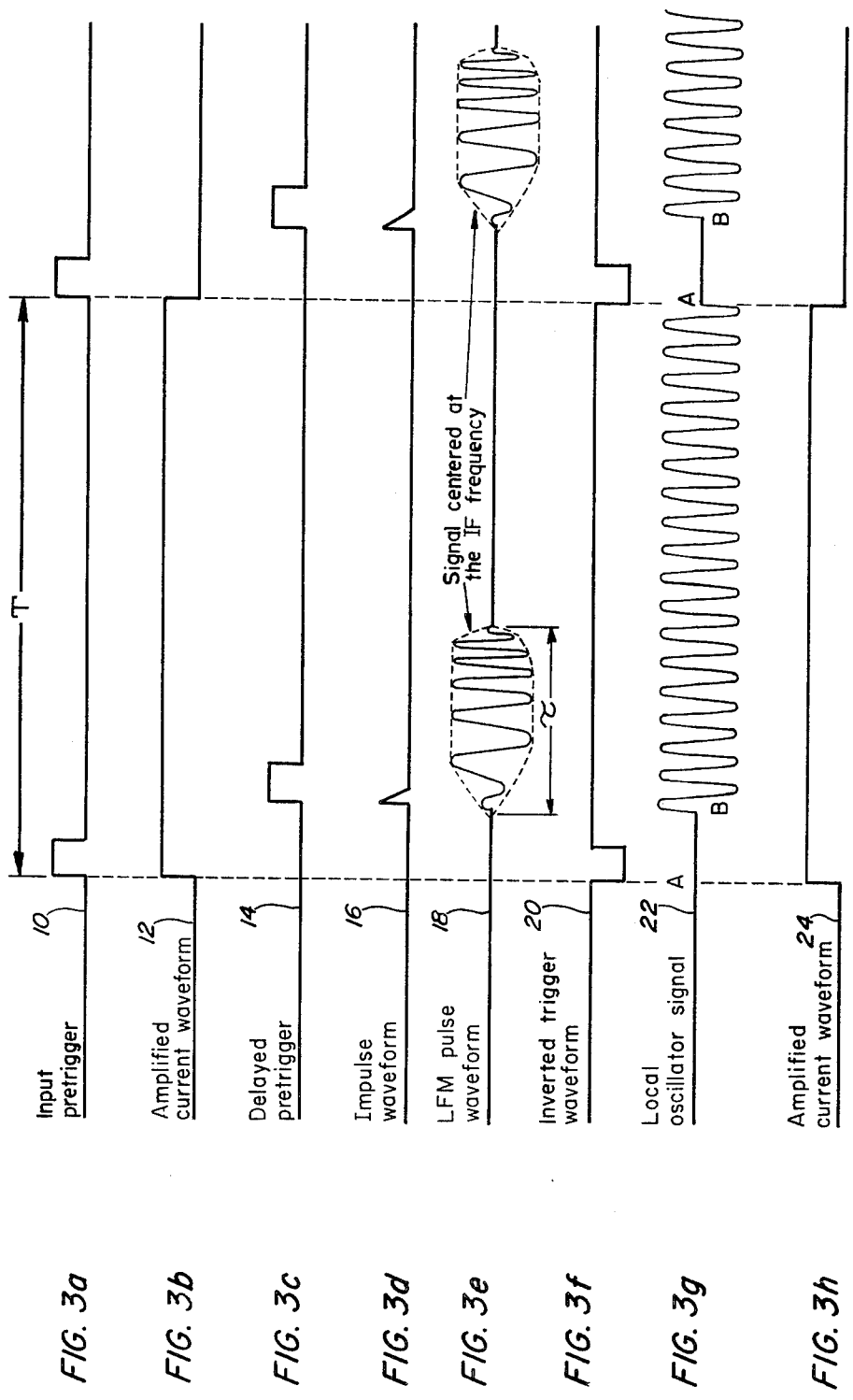

RADAR CLUTTER REDUCTION BY USE OF FREQUENCY-DIVERSE, WIDEBAND PULSE-COMPRESSION WAVEFORMS

BACKGROUND OF THE INVENTION

The present invention relates to radar declutter systems and especially to a method of and an apparatus for generating and receiving frequency-diversity, wideband, pulse-compression waveforms that minimize the effect of clutter returns in radar displays.

Clutter returns tend to mask the display of targets on a radar scope so that the target cannot be seen. Clutter may be considered to consist of an erratically varying signal that is specified in terms of a complex reflection density which has both an amplitude and a phase component. At a specified range delay, the transmitted radar pulse samples the clutter reflection density amplitude and phase components over a surface area that is equivalent to the pulse width. The sampled clutter amplitude is related to the pulse width, antenna beamwidth, depression angle and range from the radar, and is the product of the amplitudes of the clutter patch and the radar pulse. The sampled phase response is the sum of the clutter patch response and the pulse range phase response. The resultant clutter signal at the radar receiver consists of the phasor sum of the returns from various clutter patches illuminated by the radar pulse. The clutter may be assumed to consist of a discrete collection of point targets called clutter patches, arbitrarily dispersed along a reflecting surface with arbitrary radar reflecting properties, with some mutual but negligible coupling between the clutter patches.

Clutter may be minimized by the decorrelation of clutter signals returned from succeeding radar transmitted pulses. Clutter may be decorrelated on the basis of frequency diversity of successive radar pulses and also spatially decorrelated by increasing the radar pulse emission bandwidth. Thus, if a transmitted, wideband, expanded pulse waveform, which spatially decorrelates clutter, is frequency-hopped from pulse to pulse by the proper frequency amount and the returned radar signals are first compressed and delayed by one pulse interval and then correlated with the next received signal, clutter patches will be decorrelated. The frequency separation between two succeeding pulses, for frequency decorrelation, must be equal to at least the reciprocal of the compressed pulse width or equal to the emission bandwidth of the transmitted waveform. This technique is used by the present invention and will operate with both coherent and noncoherent frequency-diversity waveforms.

SUMMARY OF THE INVENTION

An object of the invention is to generate and receive frequency-diversity, wideband, pulse-compression waveforms that reduce the effects of clutter returns in a radar set.

Another object is to prevent second-time-around target echoes from being processed and presented as legitimate targets on the radar display unit.

A further object is to lock the transmitter frequency to the transmitter local oscillator (L.O.) frequency, rather than lock the L.O. frequency to the transmitter frequency as is the usual method.

The present invention uses a double sideband modulator to produce an upper and a lower sideband pulse-compression signal. (Pulse-compression signal or waveform is the generic term used herein for both the expanded transmitted pulse and the received pulse after it has been compressed.) A coherent, pulse-compression signal, that is linearly frequency-modulated during its duration, is generated by applying a very narrow pulse (an impulse) to a pulse-expansion filter, such as a surface acoustic wave (SAW) dispersive filter. The center frequency of this pulse-compression signal is equal to the intermediate frequency (IF) of the radar receiver. A stable local oscillator that is tunable over a predetermined frequency range is driven to a specific phase when the impulse is applied to the pulse-expansion filter to ensure that the starting phases of the L.O. signal and the pulse-compression signal are phase-coherent. (This is required only for those radar systems designed to be coherent.) The pulse-compression signal at the IF frequency may be power-amplified and then applied to a double sideband modulator along with the stable L.O. signal. The output of the pulse-expansion filter is:

$$S_1(t) = A \cos [\omega_{IF} t + \mu t^2/2]$$

$$\text{for} -\tau/2 \leq t \leq \tau/2$$

$$S_1(t) = 0, \text{ elsewhere}$$

where A is the peak amplitude, $\omega_{IF}$ is equal to $2\pi f_{IF}$, with $f_{IF}$ equal to the IF frequency, t is a variable time, and $\mu$ is equal to $2\pi f_d/\tau$ where $f_d$ is the change in the carrier frequency during the pulse duration $\tau$. The pulse-compression ratio is defined as the product $f_d \tau$ and is greater than unity. The output signal of the L.O. for coherent systems, which require an ultra-stable oscillator, will always start at a specific phase at the leading edge of the pulse-compression signal. In essence, the L.O. is phase-locked to a predetermined phase at each delayed-trigger application. If, for simplicity, it is assumed that the initial phase is zero, the L.O. signal is given by:

$$S_2(t) = B \cos \omega_{lo} t - \tau/2 \leq t \leq T - \tau/2$$

where $\omega_{lo}$ equals $2\pi f_{lo}$, T is the interpulse period and $f_{lo}$ is the frequency of the L.O.

The output of the double sideband modulator consists of two coherent pulse-compression waveforms, one at a frequency $f_{IF+lo}$ above the L.O. frequency and one at a frequency $f_{IF-lo}$ below the L.O. frequency. The output waveforms of the double balanced modulator are:

$$S_3(t) = C/2 \cos [\omega_{lo} + \omega_{IF}) t + \tfrac{1}{2}\mu t^2] + C/2 \cos [\omega_{lo} - \omega_{IF}) t - \tfrac{1}{2}\mu t^2]$$

$$\text{for} -\tau/2 \leq t \leq \tau/2$$

$$S_3(t) = 0, \text{ elsewhere}$$

where C is the signal amplitude.

The upper or lower sideband is selected on alternate intervals to pass through a power amplifier to the antenna. Because both sidebands and L.O. waveforms are available at each pulse interval, the switching required to select either sideband can be accomplished during the interpulse period (T). The waveform applied to the antenna is:

$$S_4(t) = E \cos [\omega_{lo} + \omega_{IF}) t + \tfrac{1}{2}\mu t^2]$$

$$\text{for } 2kT - \tau/2 \leq t \leq 2kT + \tau/2$$

k=0,1,2,...,N $$S_4(t) = E \cos[(\omega_{1o} - \omega_{IF})t - \tfrac{1}{2}\mu t^2]$$

for $(2k+1)T - \tau/2 \leq t \leq (2k+1)T + \tau/2$ where E is the peak amplitude of the frequency-diversity pulse-compression waveform.

The reflected signals are passed through the antenna to the receiving portion of the apparatus. The reflected signal is heterodyned with the L.O. signal to yield a waveform at the IF frequency. The waveform is pulse-compressed in a matched filter (i.e., matched to the filter which expanded the transmitted pulse) and put through a correlation process which decorrelates the clutter echoes.

The invention prevents second-time-around target returns from being processed and presented at the receiver output because second-time-around target returns will be at the wrong sideband frequency and cannot be processed by the receiver.

BRIEF DESCRIPTION OF THE DRAWINGS

FIGS. 3a–h represent a timing/waveform diagram illustrating the timing sequences of the various signals in the transmitter and receiver.

DETAILED DESCRIPTION OF THE INVENTION

Figure 1:
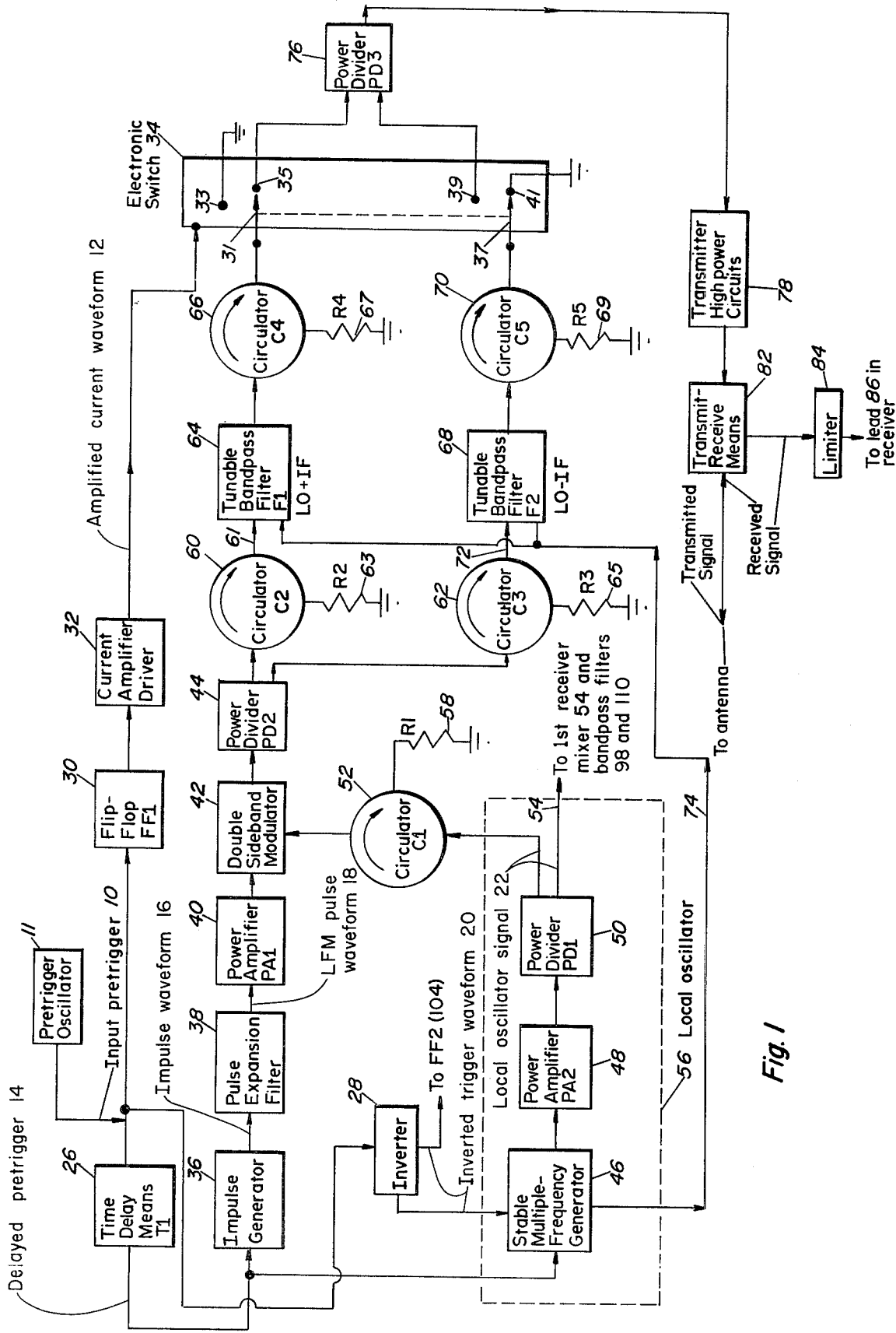
FIG. 1 is a block diagram of the apparatus suitable for generating frequency-diversity pulse-compression waveforms in accordance with this invention.

FIG. 1 shows the block diagram of an apparatus suitable for generating the frequency-diversity pulse-compression waveforms of the present invention, FIGS. 3a–h show the timing sequence required for the invention. Referring then to FIGS. 1 and 3a–h as viewed concurrently, the radar system input pretrigger waveform 10, shown in FIG. 3a, from a pretrigger oscillator 11 is applied to a time delay means 26 (T1). The input pretrigger 10 is also applied to an inverter 28, and to a flip-flop 30 (FFI). The input pretrigger 10 causes the flip-flop 30 to change states and the amplified current waveform 12, shown in FIG. 3b, is applied to an electronic Switch 34 by a current amplifier driver 32. The current applied to the electronic switch 34 causes the switch pole 31 to switch to contact 33 and switch pole 37 to switch to contact 39. The electronic switch 34 stays in this mode until the next input pretrigger 10 is generated.

A delayed radar system pretrigger 14 at the output of time delay means 26, as shown in FIG. 3c, is applied simultaneously to an impulse generator 36 and to a stable multiple frequency generator 46 portion of a local oscillator 56. The delayed pretrigger 14 applied to the impulse waveform generator 36 causes an impulse 16, shown in FIG. 3d, to be applied to a pulse-expansion filter 38 which forms a linearly frequency-modulated (LFM) pulse waveform 18 (FIG. 3e) at its output. The characteristics of the LFM pulse waveform 18 at the output of the pulse-expansion filter 38 depend upon the design of the pulse-expansion filter 38, which is determined by the radar system requirements. Pulse-expansion filters, such as surface-acoustic wave (SAW) filters, are readily available from a number of different manufacturers. As shown in FIG. 3a, the output of the pulse-expansion filter 38 is a phase-coherent LFM pulse whose center frequency is equal to the IF frequency of the radar receiver used. The output of the pulse-expansion filter 38 is applied to a power amplifier 40 (PA1). The power-amplified LFM signal at the output of the power amplifier 40 is applied to a double sideband modulator 42.

For coherent radar systems, the delayed pretrigger 14 is also applied to the stable multiple-frequency generator 46 to phase-synchronize the local oscillator 56 during each interpulse period (T). The stable multiple-frequency generator 46 is turned off by an inverted trigger waveform 20, shown in FIG. 3f, until the delayed pretrigger 14 from time delay means 26 is applied. This action causes the multiple-frequency generator 46 to turn-off, as indicated by the local oscillator signal 22, at a precise point (A), and to start oscillating again, as indicated by the local oscillator signal 22, at a precise point (B). As shown, oscillation starts at the same time as the impulse waveform 16 is applied to the pulse-expansion filter 38. The output of the stable multiple-frequency generator 46 is applied to a power amplifier 48 (PA 2), the output of which is applied to a power divider 50 (PD1). The outputs of the power divider 50, shown in FIG. 3g are applied to a circulator 52 (C1) and to a receiver mixer 54 (see FIG. 2). The output signal of the circulator 52 is applied to the double sideband modulator 42, and any energy reflected back from the double sideband modulator 42 returns to the circulator 52 and is dissipated in a resistor 58 (R1). FIG. 1 shows the load resistor 58 external to the circulator 52, but it can be physically located within the circulator.

The double sideband modulator 42 combines the input pulse-compression waveform from the power amplifier 40 and the input signal coming from the stable multiple-frequency local oscillator (56) through the circulator 52 (C1) to form double-sideband pulse-compression signals at the local oscillator frequency plus the IF frequency, and at the local oscillator frequency minus the IF frequency. The double-sideband pulse-compression signals are applied to a power divider 44 (PD2), the output of which is applied to a circulator 60 (C2) and a circulator 62 (C3) simultaneously.

The output of the circulator 60 is applied to a tunable bandpass filter 64 (F1) tuned to the upper sideband frequency, which is equal to the sum of the local oscillator frequency and the IF frequency. The energy at frequencies not within the pass band of the tunable filter 64 is reflected from the filter 64 and returned via conductor 61 to the circulator 60 and dissipated in its load resistor 63 (R2).

The output of the circulator 62 (C3) is applied to a tunable bandpass filter 68 (F2) tuned to the lower sideband frequency, which is equal to the difference between the local oscillator frequency and the IF frequency. The energy at frequencies not within the pass band of the tunable filter 68 is reflected from the filter 68 and returned to the circulator 62 via the conductor 72 and dissipated in its load resistor 65 (R3).

The tunable filters 64 and 68 may be either mechanically or electronically tunable. FIG. 1 illustrates the filters as being electronically tunable, with the tuning signal being generated in the stable multiple-frequency generator 46 and applied to the tunable filters via a conductor 74. Electronically tunable filters such as YIG filters with frequency discriminators to track the local oscillator are readily available. Electronic tuning of filter 64 and filter 68 will ensure that the filters are always tuned to the proper frequency when the local oscillator frequency is changed.

The output of the filter 64 is applied to a circulator 66 (C4) and thence to a switch pole 31 of the electronic switch 34. If the switch pole 31 of the electronic switch 34 is connected to contact 35, as shown in FIG. 1, the upper sideband energy is passed on to a power divider 76 (PD3). The output of the power divider 76 is applied to a high-power transmitter 78 where it is amplified, and then applied to the antenna through a transmit-receive means 82. If the switch pole 31 is connected to terminal 33, the RF energy output from the circulator 66 is shorted to ground and reflected back to the circulator 66 where the energy is dissipated in a load resistor 67 (R4).

The output of the filter 68 is applied to a circulator 70 (C5) and thence to a switch pole 37 of the electronic switch 34. If the switch pole 37 is connected to terminal 41, as shown in FIG. 1, the lower sideband energy from the circulator 70 is shorted to ground and reflected back to the circulator 70 where the energy is dissipated in a load resistor 69 (R5). If the switch pole 37 of the electronic switch 34 is connected to terminal 39, the lower sideband RF energy is applied to the power divider 76 (PD3). The output of the power divider 76 is applied to the transmitter high-power circuits 78 and eventually radiated through transmit-receive means 82 and the antenna (not shown).

The switching sequence of the electronic switch 34 is controlled by the input pretrigger and determines which sideband signal is radiated. The switching time of the electronic switch 34 is not critical and can take place during the interpulse period (T), after a signal is radiated.

Figure 2:
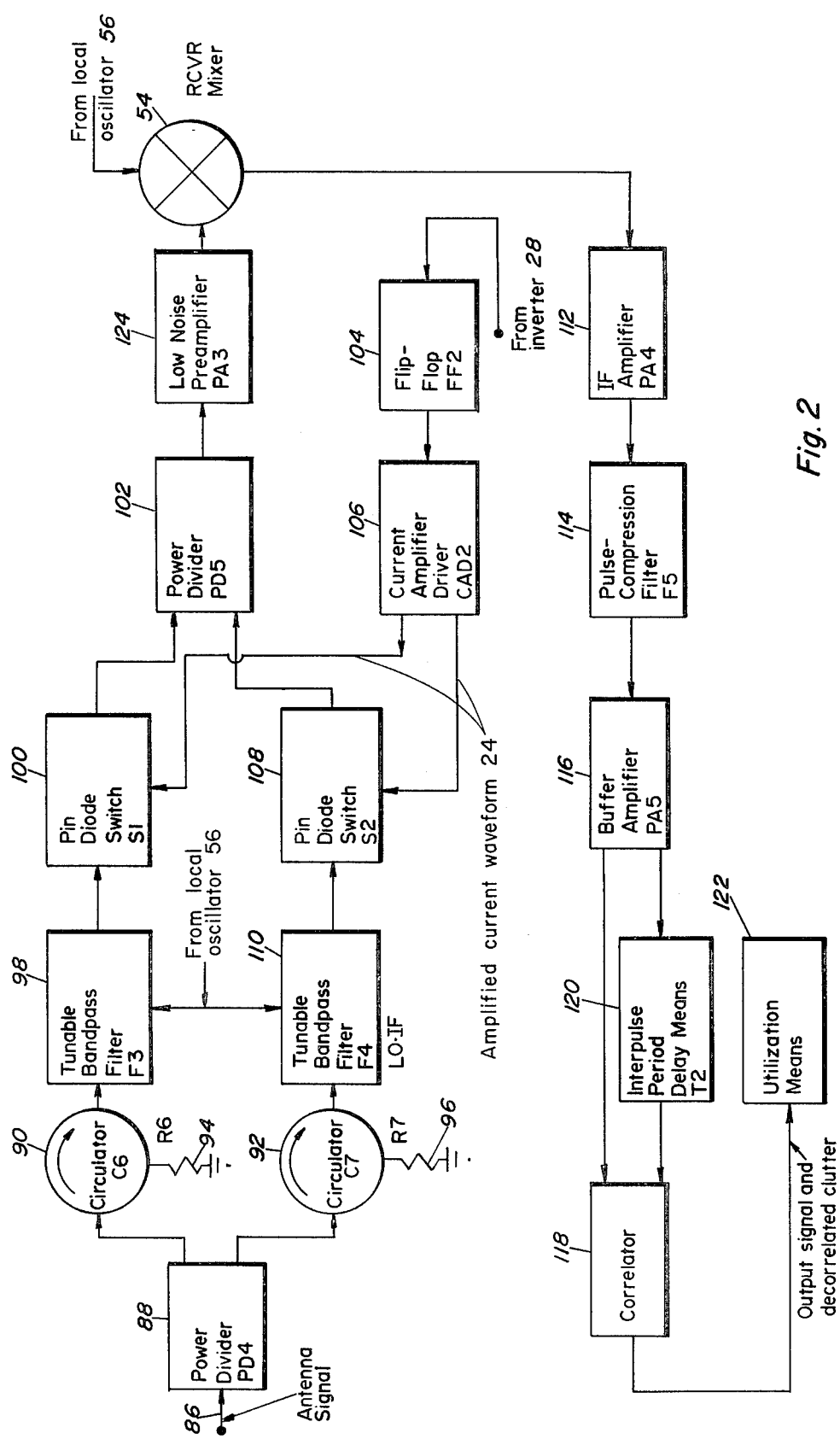
FIG. 2 is a block diagram of the apparatus suitable for receiving the reflected frequency-diversity pulse-compression waveforms in accordance with this invention.

FIG. 2 shows the block diagram of an apparatus for receiving the frequency-diversity pulse-compression waveform according to the present invention.

The reflected energy received by the antenna is applied to a power divider 88 (PD4) via the transmit-receive means 82, limiter 84 and conductor 86. The outputs of the power divider 88 are applied to a circulator 90 (C6) and to a circulator 92 (C7). An RF preamplifier may be used before the power divider 88 to improve the receiver noise figure.

The output of the circulator 90 is applied to a tunable bandpass filter 98 (F3) which is controlled by a signal from the local oscillator, to ensure that the filter 98 will pass the upper sideband of the frequency-diversity pulse-compression waveforms. The bandwidth of the filter 98 is selected to pass the desired waveform and provide sufficient rejection to the lower sideband of the frequency-diversity pulse-compression waveform. Energy not passed by the filter 98 is reflected back to the circulator 90 and is dissipated in a load resistor 94 (R6).

The output of the filter 98 is applied to a pin diode switch 100 (S1). If the last signal transmitted was the upper sideband of the frequency-diversity pulse-compression waveform, the pin diode switch 100 would be activated and the signal at the input to the switch would pass through and be applied to a power divider 102 (PD5). If the lower sideband waveform was the last signal transmitted, the switch 100 would not be activated and the energy at the input to the switch would not be passed.

The output of the inverter 28 is also applied to a flip-flop 104 (FF2), the output of which is applied to a current amplifier drive 106 (CAD2). The amplified current waveform 24 of the driver 106, shown in FIG. 3h, is applied to the pin diode switch 100 (S1) and a pin diode switch 108 (S2) simultaneously. The switches 100 and 108 are connected in such a manner that switch 100 is energized when the amplified current waveform 24 from the driver 106 is non-negative. When the amplified current waveform 24 from the driver 106 is zero (or negative depending upon the pin diode switches), the switch 100 is de-energized and the switch 108 is energized. The amplified current waveform 24 is synchronized so that the switch 100 is energized to pass signals only after the upper sideband signal has been transmitted. Switch 108 is energized only after the lower sideband signal has been transmitted. Pin diode switches can operate very rapidly, usually within 100 nanoseconds, so that the operation of switch 100 or 108 occurs during the dead-time (FIG. 3g, from A to B).

The output of the circulator 92 (C7) is applied to a tunable bandpass filter 110 (F4) which is controlled by a signal from the local oscillator, to ensure that the filter 98 will pass the lower sideband frequency-diversity pulse-compression waveform. The bandwidth of the filter 110 is selected to pass the desired waveform and provide sufficient rejection to the upper sideband of the frequency-diversity pulse-compression waveform. Energy not passed by the filter 110 is reflected back to the circulator 92 (C7) and dissipated in a load resistor 96 (R7).

The output of the filter 110 (F4) is applied to the pin diode switch 103 (S2). If the last signal transmitted was the lower sideband frequency-diversity pulse-compression waveform, the pin diode switch 108 would be activated and the signal at its input would pass through the switch and be applied to a power divider 102 (PD5). If the upper sideband of the frequency-diversity pulse-compression waveform was the last signal transmitted, the switch 108 would not be activated and the energy at the input of the switch 108 would not be passed. The switching technique employed in this receiver will also prevent second-time-around waveforms from being passed on through the receiver and being processed.

Still referring to FIG. 2, the output signal from the power divider 102 is applied to a low-noise preamplifier 124 (PA3). The low-noise amplifier 124 amplifies the signals and applies them to the receiver mixer 54 where they are combined with the signal from the local oscillator 56. The output of the receiver mixer 54 is applied to an IF amplifier 112 (PA4) which is designed to pass the IF frequency and has a bandwidth that is wide enough to pass the pulse-compression signal. The output of the IF amplifier 112 is applied to a pulse-compression filter 114 (F5) which compresses the desired signal and expands signals that are not properly matched. The pulse-compression filter 114 is matched to the pulse-expansion filter 38 in the transmitter. The result is to peak the amplitudes of the desired signal while reducing the amplitudes of the undesired signals. The output of the pulse-compression filter 114 is applied to a buffer amplifier 116 (PA5). The expansion filter 38 and compression filter 114 are well known in the art and may, for example, be Models DD30-250, DD50-500 or DD250-256 sold commercially by the Anderson Laboratories, Inc., Bloomfield, Conn.

The buffer amplifier 116 (PA5) is used to isolate the pulse-compression filter 114 (F5) from a correlator 118. The output of the buffer amplifier 116 is applied simultaneously to an interpulse period delay means 120 (T2) and to the correlator 118. The interpulse delay means 120 delays the output of the buffer amplifier 116 an amount equivalent to the interpulse period (T) shown in FIG. 3. The output of the interpulse period delay means 120 is also applied to the correlator 118. The input signals to the correlator 118 are processed and the output of the correlator 118 consists of the desired target signal and decorrelated clutter. The correlator output is then fed to a utilization means 122 which may be some type of radar display means.

Obviously, many modifications and variations of the present invention are possible in light of the above teachings. It is therefore to be understood that, within the scope of the appended claims, the invention can be practiced otherwise than as specifically described.

What is claimed is:

1. An apparatus configured to operate with an associated radar system for reducing radar clutter, said apparatus including a transmitter portion and a receiver portion, said apparatus comprising:
   a pulse expansion means of said transmitter portion including a filter having know characteristics for generating an impulse waveform, and for linearly frequency-modulating and expanding the impulse waveform into a wideband, linearly frequency-modulated, pulse-compression signal having a predetermined center frequency (IF frequency signal);
   a local oscillator means of said transmitter portion operatively connected to said pulse expansion means for generating a local oscillator signal having a stable frequency (LO frequency signal);
   a mixer means of said transmitter portion operatively connected to said pulse expansion and said local oscillator means for mixing the IF frequency signal and the LO frequency signal to produce pulse-compression signals at the (LO+IF) frequency and at the (LO−IF) frequency;
   a switch means of said transmitter portion operatively connected to said pulse expansion means, said local oscillator means and said mixer means for selectively and alternately passing the (LO−IF) and (LO+IF) pulse-compression signals to a high power transmitter circuit portion and an antenna portion of the associated radar system so as to radiate them alternately at the proper pulse intervals for the associated radar used, said switch means of said transmitter portion including a pair of tunable bandpass filters, one for passing the (LO+IF) pulse-compression signal and other for passing the (LO−IF) pulse-compression signal, said pair of tunable bandpass filters receiving their tuning signal from said local oscillator means;
   an echo derivation means of said receiver portion operatively connected to said local oscillator means of said transmitter portion for deriving return signals from the antenna portion of the associated radar system;
   a mixer means of said receiver portion operatively connected to said echo derivation means and said local oscillator means of said transmitter portion for receiving as one input the LO frequency signal;
   a switch means of said receiver portion operatively connected to said echo derivation and mixer means of said receiver portion for coupling the derived signals to said mixer means, the LO frequency signal being removed in said mixer means;
   a pulse-compression means of said receiver portion operatively connected to said mixer means of said receiver portion for compressing the output pulses therefrom thereby generating compressed pulses, said pulse-compression means being a filter matched to the filter characteristics of said pulse expansion means of said transmitter portion;
   a correlation means of said receiver portion operatively connected to said pulse-compression means for correlating each of the compressed pulses with the succeeding ones thereof, the output of said correlation means being a signal in which the target returns from the associated radar system are correlated and the clutter returns therefrom are decorrelated; and
   a timing means operatively connected to said transmitter and receiver portions so as to cause initiation of the impulse waveform of said pulse expansion means of said transmitter portion, and so as to cause activation of said switch means of both said transmitter and receiver portions.

2. The apparatus of claim 1 wherein said switch means of said transmitter portion further includes an electronic switch for alternately switching the input of the highpower transmitter circuit portion of the associated radar system between the outputs of said pair of tunable bandpass filters so that only one pulse compression signal is radiated from the antenna portion of the associated radar system at one time.

3. The apparatus of claim 2 wherein said echo derivation means of said receiver portion includes a pair of tunable bandpass filters operatively connected to the antenna portion of the associated radar system, one filter for passing wideband pulses at the (LO+IF) frequency and the other filter for passing wideband pulses at the (LO−IF) frequency, said pair of tunable bandpass filters receiving their tuning signal from said local oscillator means of said transmitter portion.

4. The apparatus of claim 3 wherein said echo derivation means of said receiver portion further includes a pair of pin diode switches operatively connected between said pair of tunable bandpass filters of said receiver portion and said mixer means of said receiver portion, and to said timing means such that the pulses at the output of each one of said pair of tunable bandpass filters is alternately connected to said mixer means.

5. The apparatus of claim 4 wherein said correlation means of said receiver portion includes a delay means for delaying each pulse from said pulse-compression means for one interpulse period (T) so that each delayed pulse can be correlated with the next incoming pulse.

6. The apparatus of claim 5 wherein said pulse expansion means of said transmitter portion includes a pretrigger oscillator for generating spaced pulses so as to initiate each impulse waveform of said pulse expansion means.

7. The apparatus of claim 6 wherein said switch means of said transmitter portion further includes a flip-flop circuit means for generating an output signal for timing the switching operations of said electronic switch, said flip-flop means being driving by said pretrigger oscillator.

* * * * *